United States Patent [19]
Bernard et al.

[11] 4,089,593
[45] May 16, 1978

[54] PORTABLE VIEWER

[75] Inventors: Stanley E. Bernard, Webster; Soto F. Flouris; Edward C. Malhoit, both of Rochester, all of N.Y.

[73] Assignee: Xerox Corporation, Stamford, Conn.

[21] Appl. No.: 724,887

[22] Filed: Sep. 20, 1976

[51] Int. Cl.² .......................................... G02B 27/02
[52] U.S. Cl. .................................. 350/236; 350/238; 350/241
[58] Field of Search ................... 240/2 R, 2 AT, 2 P, 240/6.4 R; 40/106.1, 63 A, 64 A; 350/56, 57, 235–241, 246, 251, 141, 256

[56] References Cited
U.S. PATENT DOCUMENTS

| 1,568,148 | 1/1926 | Fiske | 350/240 |
| 1,929,199 | 10/1933 | Fiske | 350/56 X |
| 2,271,380 | 1/1942 | Strang et al. | 350/57 |
| 2,604,814 | 7/1952 | Smith | 240/6.4 R X |
| 3,064,528 | 11/1962 | Gelatt | 350/239 X |
| 3,170,259 | 2/1965 | Frye | 350/236 X |
| 3,171,884 | 3/1965 | Miles | 350/240 X |

OTHER PUBLICATIONS

Model "F" Opta-vue Micro-Reader (Advertisement), Sep. 1958, (350-241).
Anderson et al., IBM Technical Disclosure Bulletin, May 1966, p. 1782, (350/Magnetic Digest).

Primary Examiner—F. L. Evans

[57] ABSTRACT

A portable viewer for microfiche transparencies. The viewer comprises a pair of spaced members between which the transparency to be viewed is inserted. A viewing system including an adjustable lens on one member and an optically aligned aperture in the other member is provided, the lens being adjustable to permit the focus thereof to be changed with lock means to retain the lens in selected focusing position. A swing away light diffuser, and auxiliary light source are provided, the diffuser serving to diffuse artificial light and, when desired, natural light. A table stand and wall attaching magnets are included to permit the viewer to be operated in a free standing fashion or to be supported on an adjoining wall surface.

9 Claims, 3 Drawing Figures

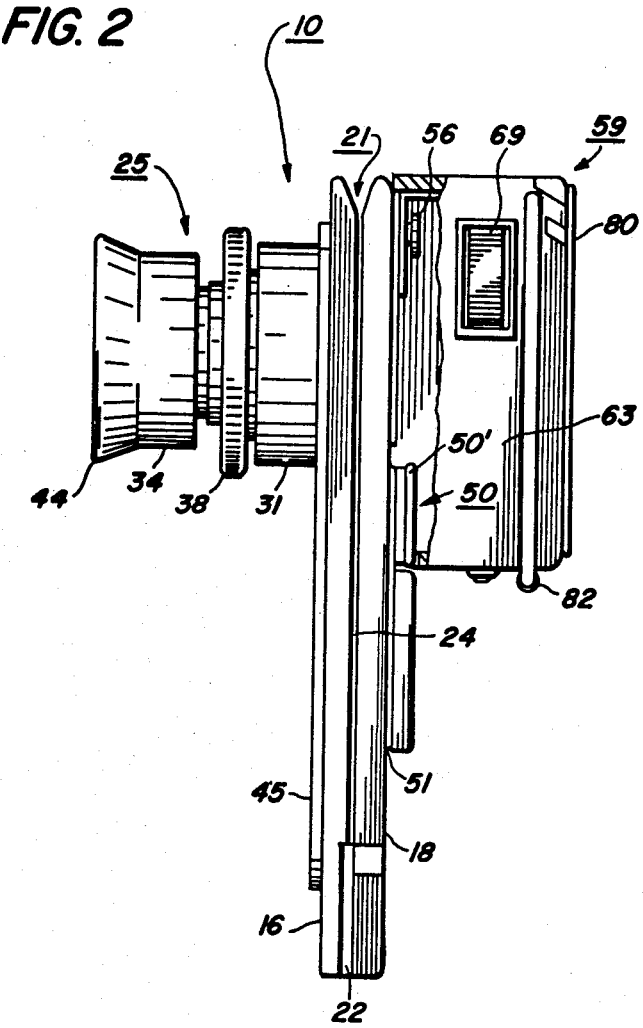

PORTABLE VIEWER

This invention relates to a device for viewing microfiche transparencies, and more particularly, to an improved viewing device for use in either ambient or artifical light.

In the complexity of modern technology, servicing, repairing, etc. of modern machines and apparatus such as copiers, computers, automobiles, and the like require highly trained personnel with off times copeous amounts of servicing literature. Obviously, and particularly in the case of on-sight servicing and repairing where the service man is required to bring the parts, tools and literature with him, it would be highly advantageous to reduce the bulk of the service literature to the smallest size and weight possible without loss or sacrifice in the content thereof.

One technique for doing so is to put the service literature on microfilm and, more conveniently for the on-sight service personnel, on microfilm bearing cards commonly termed microfiche transparencies. However, use of microfilm or microfiche transparencies requires that some device, commonly termed a viewer, be provided to enable the user i.e., the service man, to visually see and read back the film material since the image reduction is so great as to preclude reading thereof by the naked eye. While the prior art is replete with relatively large and stationary type viewers and projectors for this purpose, obviously this type of viewer or projector is unsuited for on-sight service due to the sheer bulk and weight of this type of viewer. Instead, the situation calls for a relatively small portable or hand held viewer which along with the microfiche transparancies may be conveniently carried with the service man's tools and parts.

It is a principle object of the present invention to provide a new and improved light weight viewer for microfiche transparancies.

It is a further object of the present invention to provide a portable microfilm viewer usable either with ambient or artifical light.

It is a further object of the present invention to provide a small portable microfiche viewer incorporating an improved auxiliary light pack.

It is an object of the present invention to provide a small viewer having an improved mechanism to facilitate locating of the picture area to be viewed in the viewing screen.

It is an object of the present invention to provide a small light weight viewer adapted for use in either a hand held or free standing mode.

It is an object of the present invention to provide a small portable viewer for microfilm and the like incorporating and adjustable lens for varying the focus.

It is an object of the present invention to provide a small microfiche viewer having clamp means to permit the viewer to be attached to other objects.

This invention relates to a device from viewing a microfiche transparency having discrete image areas arranged thereon in X — Y coordinates, comprising the combination, support means forming a viewing station including first and second elongated spring like members, and means attaching the members together in substantially parallel spaced relationship adjacent one end thereof whereby the inner walls of the members form a slot-like opening therebetween for receipt of a microfiche transparency, the members being free to spring apart to facilitate insertion and removal of the microfiche transparency therebetween; a viewing system on the support means arranged in optically aligned relationship for viewing the image area of the microfiche transparency disposed in the slot-like opening, the viewing system including a lens disposed on the first member adjacent the free end thereof, a light admitting aperture in the second member adjacent the free end thereof and in optical alignment with the lens, the lens and aperture cooperating to enable the image area of the microfiche transparency disposed in the slot-like opening to be viewed, light diffusing means selectively interposable across the aperture, auxiliary lamp means for illuminating the microfiche transparency in the slot-like opening, and means for releasably attaching the auxiliary lamp means to the outside wall of the second member in overlaying relationship with the aperture whereby on energization of the auxiliary lamp means the image area of the microfiche transparency in the slot like opening is illuminated for viewing thereof; and interlock means to inhibit attaching of the auxiliary lamp means to the second member except when the light diffusing means is interposed across the aperture.

Other objects and advantages will be apparent from the ensuing description and drawings in which:

FIG. 2 is a side view in cross section of the viewing device shown in FIG. 1.

Figure 1:
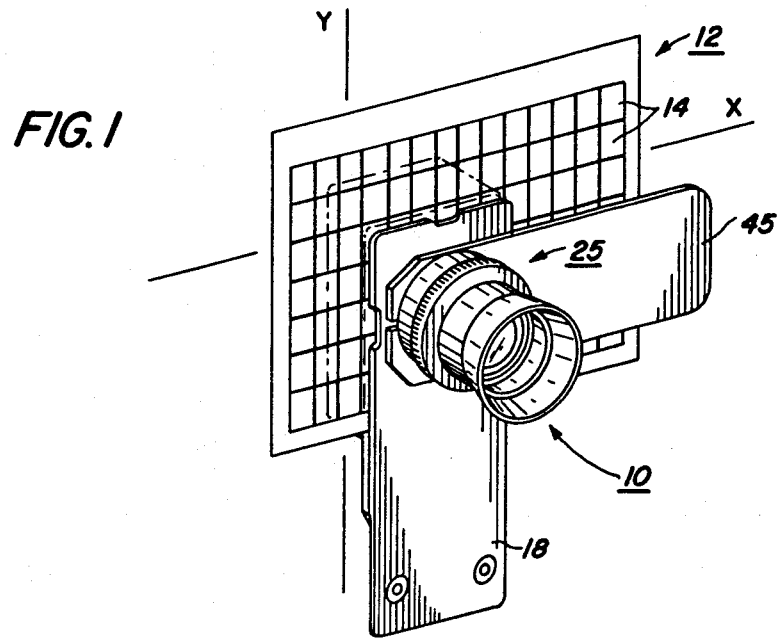
FIG. 1 is an isometric view of the viewing device of the present invention.

Referring to the drawings, the hand viewing device of the present invention, designated generally by the numeral 10, is thereshown. As will appear, viewing device 10 is intended for viewing microfiche transparencies 12 of the type having a series of generally rectangular image areas 14 thereon. Preferably, image areas 14 are arranged as a series of individual image areas extending both longitudinally across the transparency (X direction) and vertically (Y direction), it being understood that the maximum dimension of the transparency 12 in the Y direction is limited by the depth dimension of the transparency receiving slot 24 in viewing device 10. As will appear, the viewing field of the lens system 25 of viewing device 10 is preferably correlated with the dimension and configuration of image areas 14 on transparency 12 so that only a single image area is seen at one time.

Viewing device 10 includes a pair of relatively thick rectangular plate like members 16, 18 secured together as by screws 19 adjacent one end, nominally the lower end 20. A spacer 22 having a predetermined thickness is disposed between members 16, 18 at the point of attachment. Spacer 22 retains members 16, 18 separated such that an elongated slot or recess 24 is formed between the members 16, 18 over the remaining portion of their length. To facilitate insertion of a transparency 12 within slot 24, the inside walls 17 of members 16, 18 are tapered slightly such that the width of slot 24 increases in the direction of the open transparency receiving end 21. As will appear, slot 24 serves as a receptacle for transparencies 12, the dimension of spacer 22 being chosen so that members 16, 18 form a slot 24 for receipt of the microfiche transparencies 12. The dimension, i.e., width of slot 24 is chosen so that the interior slot forming walls 17 of members 16, 18 cooperate to releasably retain the transparency in selected position within slot 24. It will be understood that spacer 22 may be integral with one or both of the members 16, 18.

At least one and preferably both of the members 16, 18 are formed from a resilient material such as plastic to permit members 16, 18 to be sprung apart slightly upon insertion of a microfiche transparency 12 therebetween. The resulting pressure between members 16, 18 and the transparency 12 therebetween serves to releaseably retain the transparency in the position selected for viewing while permitting the transparency to be slid into and out of slot 24 and within the slot 24 as when changing one image area 14 to another without difficulty. A locating recess 26 is provided in the upper edge of member 16 to facilitate centering of the transparency image area with the optical axis of the viewing system.

A viewing system designated generally by the numeral 25 is mounted in optical alignment on the free ends, nominally the upper ends 16', 18', of the members 16, 18. Viewing system 25 concludes a multi-element lens 27 supported on member 16 and optically aligned with a light admitting aperture 29 in member 18.

Lens 27 comprises a multi-element lens of suitable design, having a fixed lens section 31 attached to member 16. The interior of lens section 31 is threaded at 32 for receipt of an adjustable lens section 34, the outer portion 36 of the lens section 34 being externally threaded for cooperating threaded engagement with the threaded portion 32 of the fixed lens section 31. The threaded portions 32, 36 serve to permit the lens section 34 to be assembled and disassembled within the fixed lens section 31 and also to permit the focus of lens 27 to be adjusted to the particular demands of the individual viewer's eye sight. A lock ring 38, the interior of which is suitably threaded (not shown) for engagement with the threaded portion 36 of lens section 34, serves through abutment the outside face 40 of fixed lens section 31 to releaseably retain the adjustable lens section 34 in the focusing position selected. The exterior surface of lock ring 38 is preferrably knurled at 42 to facilitate manual rotation thereof.

A resilient eye cup 44 is provided on lens 27, eye cup 44 being arranged to fold back into a retractive position or to be extended outwardly in use. Eye cup 44 facilitates viewing by shielding out ambient light and providing protection against scratching, both for lens 27 as well as for the user's eyeglasses.

Aperture 29 in member 18 comprises a generally rectangular opening, the dimensions of which is substantally equal to those of the individual image areas 14 of the microfiche transparencies 12.

To facilitate viewing and obviate the need for the user to close one eye when using the viewing device 10, a displaceable eye shield 45 is provided. Eye shield 45 comprises a generally rectangular member suitably mounted on member 16 for swinging movement about an axis coaxial with the optical axis of lens 27. The longitudinal dimension of eye shield 45 is sufficient to bridge the space between the user's eye. In using viewing device 10, eye shield 45, which is normally in a position overlaying the outside wall of member 16, is swung outwardly in the direction of the unused eye to a generally horizontal position. In this position, eye shield 45 blocks vision in the unused eye and obviates the need for the user to shut the unused eye when using viewing device 10.

To enable the viewing device 10 to be attached to walls and other surfaces, a generally T-shaped magnet 50 is mounted on the outer wall of member 18. Magnet 50, which may comprise any conventional magnet, is of a size sufficient to support the weight of the viewing device 10 on any ferro magnetic surface. Magnet 50, which is generally flat and rectangular in configuration, is mounted on a projecting portion 51 (see FIG. 2) of member 18, the width of magnet 50 being somewhat greater than that of projecting wall portion 51 so that the side edges 50' of magnet 50 project therebeyond. As will appear, edges 50' of magnet 50 cooperate with the auxiliary lamp assembly 59 to attach the lamp assembly to the viewer 10.

To protect the user's eye and facilitate viewing when the light source is relatively concentrated, as for example, when using auxiliary lamp 60 a light diffusing lens 52 is provided. Housing 54 of diffusing lens 52 is pivotally attached to the outer wall of member 18 for rotation into and out of a position spanning aperture 29. This permits diffusing lens 52 to be swung to an out of the way position as when viewing negative transparencies or when it is desired to clean lens 27. This arrangement further facilitates change-over to different density diffusing lens. As will appear, diffusing lens 52 is supported for rotation about the axis of the auxiliary lamp mounting pin 56 on member 18.

To enable viewer 10 to be used during periods when natural light is lacking, i.e., at night, an auxiliary lamp assembly 59 in the form of a battery powered lamp 60 is provided. Lamp 60 is mounted in a generally rectangular housing 62, the side of housing 62 opposite aperture 29 being open to permit light from lamp 60 to reach aperture 29.

Figure 3:
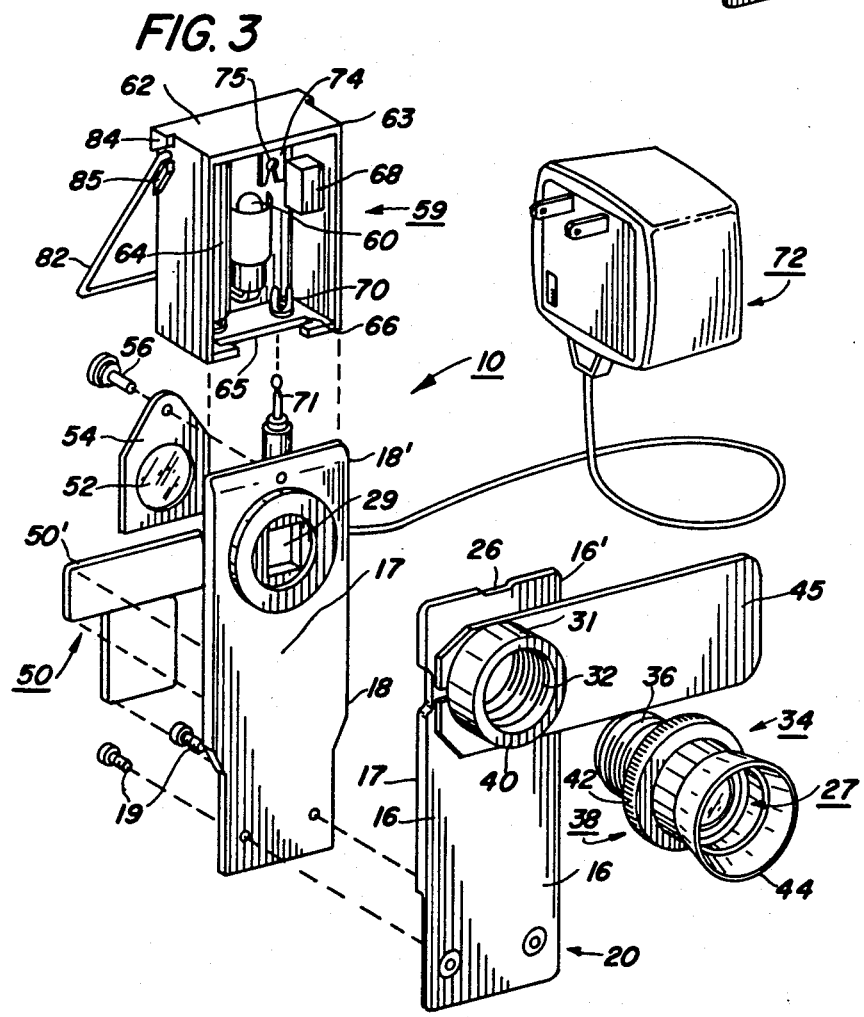
FIG. 3 is an exploded isometric view of the viewing device shown in FIG. 1 showing the details of the viewing device components.

A source of electrical energy, preferably a dry cell or battery 64 is mounted within housing 62, battery 64 being electrically connected to lamp 60 through switch 68. Preferably, switch 68 comprises a multiple position switch having an off position, an on position, and a momentary on position, the later requiring the user to hold the switch in closed position to energize lamp 60. Switch 68 is disposed in housing 62 such that the switch actuating knob 69 (seen in FIG. 3) therefore projects through one wall 63 of housing 62 for access by the user.

Battery 64 is preferably of the rechargeable type. To enable battery 64 to be recharged, a connector 70 is provided for receipt of lead 71 of a remote charger 72. Charger 72 is preferably of the type adapted for plug in to a conventional a.c. wall socket.

To enable auxiliary lamp assembly 59 to be attached to viewer 10, a slotted coupling 74 is provided within the auxiliary lamp housing 62 adjacent the upper portion thereof. Coupling 74 has a converging slot-like channel therewithin leading to a circular opening 75 within which the projecting pin 56 on member 18 is adapted for disposition. The outer dimension of pin 56 is substantially equal to or slightly less than the diameter of opening 75.

To accommodate magnet 50 on member 18 and provide interlocking engagement therewith, the lower wall of auxiliary lamp housing 72 is recessed at 65, the side edges thereof being slotted at 66 for receipt of the protruding edges 50' of magnet 50 on attachment of the auxiliary lamp assembly 59 to the viewing device 10. Magnet 80 on the outer wall of auxiliary lamp housing 62 permits the assembled viewing device to be attached to any ferromagnetic surface or wall, magnet 80 being sized sufficiently to support the wedge of both the viewing device and auxiliary lamp assembly 59.

To provide independent support for viewing device 10, a self supporting U shaped stand 82 is pivotally attached to the upper portion of the auxiliary lamp housing 62. Stand 82, when swung out to the supporting position shown, in FIG. 2, serves in cooperation with the lower edge of member 18, to support the assembled viewing device in an angular position enabling a microfiche transparency 12 within the viewing device 10 to be viewed without the necessity of manually supporting the device 10 by hand. Projecting stops 84 formed on the upper sides of auxiliary lamp housing 62 limit outward movement of the stand 62 while protrusions 85 releasably detent stand 62 against inward movement.

In use, a microfiche transparency 12 to be viewed is inserted into to slot like opening 24, the lower portion of viewer 10 being held by the user's hand. Transparency 12 may be moved in both the X and Y direction until the desired image area 14 is disposed in viewing position. During this period, or before, or subsequent thereto, the focus of lens 27 may be adjusted as needed to suit the individual user's eye. For this purpose, lock ring 38 is released and the lens housing 34 screwed in or out as appropriate until the desired focus is achieved following which lock ring 38 is turned until ring 38 comes into locking engagement with the surface 40 of lens section 31. Eye shield 45 may be swung out to cover the user's unused eye and diffuser lens 52 swung into or out of position over aperture 29 depending on the user's desires.

The user then holds the viewing device 10 up to a source of ambient light and views the image area selected therethrough.

Should ambient light be insufficient, the user may affix auxiliary lamp assembly 59 to the rear wall of member 18. This is effected by sliding housing 62 of auxiliary lamp assembly 59 in a downward direction to seat pin 56 of member 18 in opening 75 of the slotted coupling 74 on housing 62. At the same time, the projecting sides 50' of magnet 50 are received in the slot-like openings 66 in the lower wall of housing 62. With auxiliary lamp assembly 59 in position, lamp 60 may be actuated as needed using switch 68.

Use of the auxiliary lamp assembly 59 requires that diffusing lens 52 be disposed over the aperture 29. Should the user fail to dispose the diffusing lens 59 is position, housing 54 thereof prevents interengagement of pin 56 with the slotted coupling 74 of auxiliary lamp assembly 59.

With auxiliary lamp assembly 59 attached, stand 82 may be swung out to make the viewing device 10 self supporting. The magnets 50, 80 permit the viewing device 10, either with or without the auxiliary lamp assembly 59 attached, to be releaseably attached to metal walls.

While the invention has been described with reference to the structure disclosed, it is not confined to the details set forth, but is intended to cover such modifications or changes as may come within the scope of the following claims.

What is claimed is:

1. A device for viewing a microfiche transparency having discrete image areas arranged thereon in X — Y coordinates, comprising:
   support means forming a viewing station, said support means including
   first and second elongated members, and
   means attaching said members together in substantially parallel spaced relationship adjacent one end thereof whereby the inner walls of said members form a slot-like opening therebetween adjacent the free end thereof for receipt of a microfiche transparency, the free ends of said members being free to spring apart to facilitate insertion and removal of a microfiche transparency therebetween;
   a viewing system on said support means arranged in optically aligned relationship for viewing the image area of a microfiche transparency disposed in said slot-like opening, said viewing system including
   a lens disposed on said first member adjacent the free end thereof,
   a light admitting aperture in said second member adjacent the free end thereof and in optical alignment with said lens, said lens and aperture cooperating to enable the image area of a microfiche transparency disposed in said slot-like opening to be viewed,
   light diffusing means selectively interposable across said aperture,
   auxiliary lamp means for illuminating the microfiche transparency in said slot-like opening, and
   means for releasably attaching said auxiliary lamp means to the outside wall of said second member in overlaying relationship with said aperture whereby on energization of said auxiliary lamp means the image area of the microfiche transparency in said slot-like opening is illuminated for viewing thereof; and
   interlock means to inhibit attaching of said auxiliary lamp means to said second member except when said light diffusing means is interposed across said aperture.

2. The device according to claim 1 including
   means for adjusting the focus of said lens, and
   lock means for releasably retaining said lens in the focus selected.

3. The device according to claim 1 in which said lens includes an eye cup to facilitate viewing,
   said eye cup being disposable selectively to an inoperative position.

4. The device according to claim 1 in which said auxiliary lamp means includes
   a housing,
   a lamp in said housing,
   a source of electrical energy, and
   switch means for selectively coupling said lamp to said energy source to energize said lamp;
   said releaseable attaching means including
   a pin-like projection on the outer wall of said second member adjacent said aperture, and
   a slot in said housing for receiving said projection upon disposition of said lamp means housing in face-to-face sliding relationship with the outer wall of said second member whereby to releasably attach said auxiliary lamp means to said device.

5. The device according to claim 4 in which disposition of said light diffusing means to an inoperative position prevents receipt of said projection in said lamp means slot.

6. The device according to claim 1 including a magnet on the outside wall of said second member for supporting said device on ferro magnetic surfaces when said auxiliary lamp means is removed.

7. The device according to claim 6 in which said auxiliary lamp means includes a housing having an exterior wall, and a second magnet on said lamp means housing exterior wall to permit said device with said auxiliary lamp means to be releaseably attached to ferro magnetic surfaces.

8. The device according to claim 1 in which said auxiliary lamp means includes means for selectively supporting said device in viewing position on a surface.

9. The device according to claim 1 in which the inside walls of said members are tapered outwardly whereby to form a diverging opening to facilitate insertion of a microfiche transparency therewithin.

* * * * *